(12) United States Patent
Grabau

(10) Patent No.: US 9,254,613 B2
(45) Date of Patent: Feb. 9, 2016

(54) REGENERATING SURFACE PROPERTIES FOR COMPOSITES

(75) Inventor: Peter Grabau, Kolding (DK)

(73) Assignee: LM GLASFIBER A/S, Kolding (DK)

( * ) Notice: Subject to any disclaimer, the term of this patent is extended or adjusted under 35 U.S.C. 154(b) by 683 days.

(21) Appl. No.: 12/920,830

(22) PCT Filed: Mar. 4, 2009

(86) PCT No.: PCT/DK2009/000060
§ 371 (c)(1),
(2), (4) Date: Dec. 20, 2010

(87) PCT Pub. No.: WO2009/109193
PCT Pub. Date: Sep. 11, 2009

(65) Prior Publication Data
US 2011/0129646 A1    Jun. 2, 2011

(30) Foreign Application Priority Data
Mar. 4, 2008   (EP) .................................. 08003954

(51) Int. Cl.
*B32B 3/30* (2006.01)
*B05D 5/00* (2006.01)
*B29C 41/22* (2006.01)
*B29C 70/64* (2006.01)
(Continued)

(52) U.S. Cl.
CPC ............... *B29C 70/64* (2013.01); *B29C 70/086* (2013.01); *B29C 70/443* (2013.01); *B29K 2027/18* (2013.01); *B29K 2995/0093* (2013.01); *B29L 2031/08* (2013.01); *B29L 2031/085* (2013.01); *B29L 2031/307* (2013.01); *Y10T 428/24372* (2015.01); *Y10T 428/24413* (2015.01); *Y10T 428/24421* (2015.01)

(58) Field of Classification Search
CPC . B29C 70/086; B29C 70/64; B29L 2031/307; B29L 2031/085
USPC .................................. 428/141–143, 148, 149
See application file for complete search history.

(56) References Cited

U.S. PATENT DOCUMENTS 6,716,513 B1 *  4/2004  Hasuo et al. .................. 428/141
7,258,731 B2    8/2007  D'Urso et al.
(Continued)

FOREIGN PATENT DOCUMENTS

DE          1045810       12/1958
DE          10134362 A1    1/2003
(Continued)

*Primary Examiner* — Laura Auer
(74) *Attorney, Agent, or Firm* — Nath, Goldberg & Meyer; Jerald L. Meyer; Tanya E. Harkins

(57) ABSTRACT

This invention relates to a method for manufacturing a composite member, where a number of different material layers including at least one layer of gelcoat are applied in a mold, and where resin is applied for joining of the layers. The method is new in that particles are added to the gelcoat, whereby the gelcoat comprising such particles forms an outermost layer on at least a part of the manufactured composite member. Hereby is obtained a composite with a hydrophobic and lotus-like surface yielding good self-cleaning properties and which is on the same time self-regenerating. The invention furthermore relates to composite members comprising such a gelcoat layer with particles and to the use of gelcoat comprising particles for giving regenerating self-cleaning properties.

12 Claims, 3 Drawing Sheets

(51) Int. Cl.
B29C 70/08 (2006.01)
*B29C 70/44* (2006.01)
*B29K 27/18* (2006.01)
*B29L 31/08* (2006.01)
*B29L 31/30* (2006.01)

(56) References Cited

U.S. PATENT DOCUMENTS

| | | | |
|---|---|---|---|
| 2003/0013795 A1 | 1/2003 | Nun et al. | |
| 2004/0081818 A1* | 4/2004 | Baumann et al. | 428/323 |
| 2006/0216476 A1* | 9/2006 | Ganti et al. | 428/143 |
| 2008/0274359 A1* | 11/2008 | Lawrence et al. | 428/409 |

FOREIGN PATENT DOCUMENTS

| | | |
|---|---|---|
| DE | 10 2004 037 812 A1 | 2/2006 |
| EP | 0881384 A1 | 12/1998 |
| EP | 1 283 076 A2 | 2/2003 |
| EP | 1 707 594 A1 | 10/2006 |
| FR | 2 572 023 A1 | 4/1986 |
| GB | 2254382 A | 7/1992 |
| JP | 58-199120 A | 11/1983 |
| WO | 96/04123 A1 | 2/1996 |
| WO | 00/34651 A1 | 6/2000 |
| WO | 03/076090 A1 | 9/2003 |
| WO | 2005/030893 A1 | 4/2005 |
| WO | 2005044749 A2 | 5/2005 |
| WO | 2005071262 A1 | 8/2005 |

* cited by examiner

REGENERATING SURFACE PROPERTIES FOR COMPOSITES

This is a National Phase Application filed under 35 U.S.C. §371 as a national stage of PCT/DK2009/000060, filed on Mar. 4, 2009, claiming the benefit of European Patent Application 08003954.8, filed on Mar. 4, 2008, the content of each of which is hereby incorporated by reference in its entirety.

FIELD OF THE INVENTION

The present invention relates to a method for manufacturing a composite member, where a number of different material layers including at least one layer of gelcoat are applied in a mould, and where resin is applied for joining of the layers and with the purpose of obtaining self-regenerating self-cleaning properties of the composite.

BACKGROUND

Components made of composite materials play an increasing role in everyday life and are increasingly used for structural components, where the possibility of obtaining parts with high stiffness and strength properties yet low weight are important or advantageous. Thus, composite structures are used more and more in the manufacture of parts and finished goods in various industries such as in the wind turbine, automotive, trucking, aerospace, marine, rail, appliance, container, construction, anti-corrosion, electrical and medical industries as well as in athletic equipments, recreation vehicles and such.

For most components, the properties of the surfaces play an important role such as for instance high resistance to UV-light, hardness, low friction coefficients in specific areas, surfaces that are easy to repair without visual impair, and low or high reflection coefficients etc. depending on the specific requirements and use of the component in question.

Hydrophobic properties are very advantageous especially in many outdoor applications in yielding a self-cleaning and dirt-repelling effect as small particles, contaminants and insects etc are more easily washed off with the water being repelled from the hydrophobic surface due to its low surface energy. A similar self-cleaning effect is obtained on surfaces with the so-called lotus effect characterized by small elevations and depressions, or a very porous surface structure in the micro- and/or nano-scale containing trapped air. Such surfaces are also advantageous in reducing the noise, e.g. arising from the blades on a wind turbine, in use and in reducing the drag from a surrounding fluid. Such surfaces and methods for their manufacture are described in EP1141543, EP0772514, DE102004037812 and U.S. Pat. No. 7,258,731 among others. A significant disadvantage with the described self-cleaning surfaces is, however, that the self-cleaning and dirt-repelling effect is prone to be worn off after a relatively short period of time of course depending on how the component in consideration is used. The surface properties will then have to be renewed for instance by spraying, painting or in another way applying a new coating. This is in many applications a very impractical or perhaps even impossible procedure to perform and is in all cases both very time-consuming and costly.

EP1283076 describes a method of obtaining a hydrophobic surface structure which is at least partly self-regenerating. The surface is formed by securing particles on and in a carrier layer. When the carrier layer and the particles on the surface along with it are worn off, new particles are gradually exposed regenerating the surface properties. The coating is applied by spray, brush, a jet or the like which, however, is disadvantageous for a number of applications as only a relatively thin layer thickness can be obtained by these methods as the layer otherwise has a tendency to become wrinkled and uneven and the strength of the layer will be limited. Alternatively, in order to obtain a thicker surface layer of a higher strength, the coating must be applied by a number of thin layer applications which then render the manufacturing method time-consuming and uneconomical.

OBJECT AND SUMMARY OF THE INVENTION

It is therefore an object of the present invention to provide an alternative method of producing composite components with regenerating self-cleaning surfaces solving or at least partly overcoming the problems mentioned above.

According to one aspect the present invention relates to a method for manufacturing a composite member, wherein the method comprises applying different material layers comprising at least one layer of gelcoat in a mould, and wherein resin is applied for joining of the layers, and where particles are adding to the gelcoat so that gelcoat comprising said particles forms an outermost layer on at least a part of the manufactured composite member.

Due to the particles in the gelcoat of which some will protrude from the finished gelcoated composite surface is hereby obtained a composite member with a hydrophobic surface and lotus effect properties. The surface thereby becomes self-cleaning in that water droplets will repel from the surface, roll off very easily taking with them dirt particles, organic impurities etc. A lotus-like surface according to the effect is also advantageous in decreasing the noise emitted from composite components such as rotating blades on a wind power plant or the like. Furthermore, surfaces with lotus-effect properties are advantageous in lowering the fluid resistance (the drag).

The method according to the invention is furthermore advantageous in resulting in self-cleaning surface properties that are self-regenerating because new particles become naturally and automatically exposed if the surface for some reason is worn, frayed or damaged. The advantageous surface properties may also simply and easily be renewed by grinding or polishing the surface or parts of the surface to the extent needed to expose new particles.

Compared to prior art methods of spraying or painting on hydrophobic coatings, the proposed method is advantageous in being very time-saving as the process step of spraying or painting is completely avoided. The method therefore represents great savings on material and is far more inexpensive. Also, no extra or new process steps or time are added in the manufacture and production which therefore is straight forward to implement and highly cost effective. Furthermore, adding the particles to the gelcoat is advantageous as thicker layer(s) hereby can be obtained compared to when a coating or paint is to be sprayed or painted onto a demoulded component, where only thin layers can be applied at a time. This in turn implies that a gelcoated composite manufactured according to the invention can possibly be worn or grinded down over a longer time (as the surface layer is thicker) and that the life time of the component becomes correspondingly longer.

In an embodiment, said manufacturing method further comprises abrading at least a part of the composite member thereby at least partly exposing some of said particles. This is advantageous in enhancing the hydrophobic properties and lotus effect of the surface in a very simple and fast manner. The abrading can be done for instance by polishing, sand blasting, grinding, etc.

In a further embodiment, the adding of particles is done after and/or prior to the application of gelcoat in the mould.

In an embodiment, the manufacturing method further comprises applying a thin layer e.g. by spraying of at least a part of the surface with a fluorous compound, thus in a simple way improving the hydrophobic properties of the surface further.

In a further embodiment, at least one material layer of the component is of a fibre reinforced material and/or a plastic foam material.

In yet a further embodiment, the method according to the above is a vacuum forming process, which is a very common and effective method for the production of composite components of various sorts.

In yet a further embodiment, the composite member manufactured according to any of the above is a part of a wind power plant such as e.g. a blade or a nacelle.

According to another aspect, the present invention relates to a composite member comprising an outermost layer of gelcoat, where the outermost layer comprises a number of at least partly exposed particles. Such a composite member is advantageous for the reasons mentioned previously in relation to the manufacturing method.

In an embodiment the particles in the composite member according to the above are of one or more materials belonging to the group of $TiO_2$, $Al_2O_3$, $SiO_2$ and $ZrO_2$. These materials are all advantageous in resulting in surfaces with the previously described hydrophobic and lotus-like properties. Particles of $TiO_2$ are further advantageous in that organic impurities, dirt and grease are decomposed or broken down when the $TiO_2$-particles are subjected to UV light from e.g. the sun. Thereby the dirt can more easily be washed off or swept away by fluids such as e.g. rain.

In a further embodiment, a composite member according to the above comprises surface areas both with and without the at least partly exposed particles. Hereby is obtained that the particles can be added in the regions where the self-cleaning properties are advantageous. Furthermore, the surface hereby obtains ice repellant properties in that the exposed particles act as seeds where snow flakes and ice crystals will initiate and grow but then eventually fall off before a covering ice sheet is formed due to the surrounding particle-free areas.

In a further embodiment said surface areas are arranged in a pattern.

According to other aspects, the present invention relates to a part for a wind power plant such as e.g. a blade or a nacelle or to a part for a boat such as e.g. a hull which are characterized by comprising a composite member according to the previous. The advantages are as described above.

The invention finally relates to the use of a gelcoat comprising particles of e.g. $TiO_2$, $Al_2O_3$, $SiO_2$ and/or $ZrO_2$ for giving regenerating self-cleaning properties. This is advantageous for the same reasons as mentioned previously in relation to the method and the composite member.

BRIEF DESCRIPTION OF THE DRAWINGS

In the following, preferred embodiments of the invention will be described referring to the figures, where.

DESCRIPTION OF PREFERRED EMBODIMENTS

Figure 1:
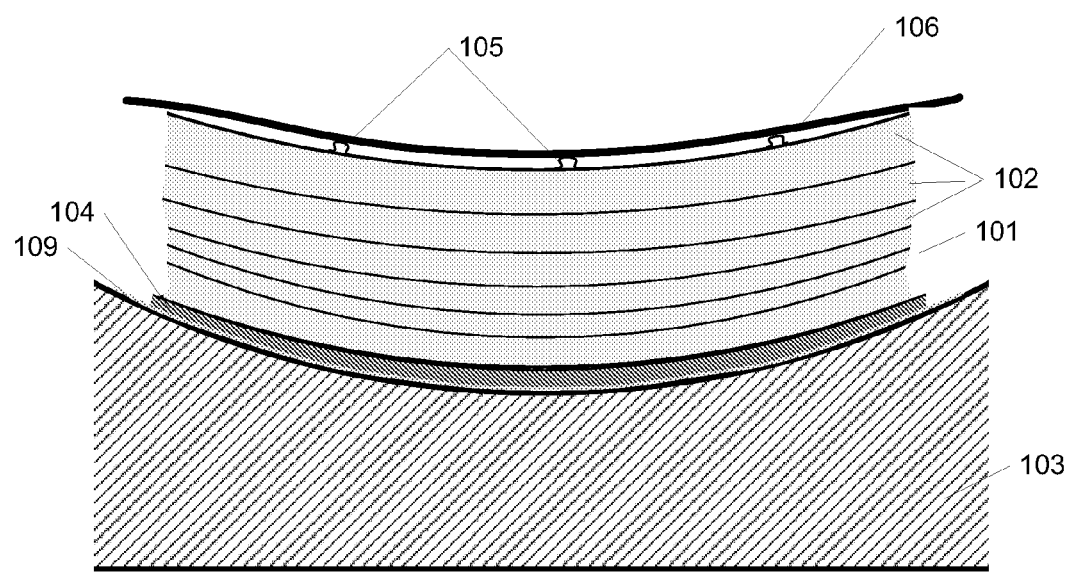
FIG. 1 shows the manufacture of a composite member as known in the art.

FIG. 1 illustrates the manufacture of a composite member or laminate 101 in this case by resin injection or infusion or by resin transfer moulding as known in the art. The material layers 102 in the laminate are here impregnated with resin totally or partly by means of vacuum. The production method is very used for instance in the production of parts for wind turbine blades, ships, vehicles etc.

The form part or mould 103 may first be coated on the inside with a waxy substance 109 to prevent adhesion between the moulded product and the mould. This waxed surface can be reused for more than one moulding processes before it needs to be reapplied. Thereafter, a layer of gelcoat 104 is applied to the surface and the gelcoat is allowed to gel. This gives a somewhat hard surface to the finished product with a high finish. A number of material layers 102 are laid in the mould 103, and in some areas a core material (e.g. balsawood) can be laid between the fibre layers as well, forming a sandwich construction. The material layers 102 can, for instance, comprise layers or mats of fibrous materials such as glass fibres or carbon fibres and can be both woven and/or non-woven or of chopped fibres and/or a plastic foam material. The resin is distributed and infused via a number of inlets 105 and a so-called resin distribution member or spacer (not shown) which most often are placed over the layers 102 as illustrated in the FIG. 1. The layers are covered and the mould is closed with a vacuum bag or foil 106 which can be attached in several ways along the edges of the form part (not shown) so that the mould cavity between the vacuum foil and the mould is sealed. Negative pressure in the mould cavity is established prior to the injection, for instance from along the mould edge or from tubes in the form part. Hereafter the resin is distributed from the inlets 105 and out and down through the resin distribution member impregnating the layers 102 by infusion caused by the vacuum and/or by injection where the resin supply is under pressure.

When the composite member 101 is produced and at least partly cured the vacuum foil 106 is removed and often also the resin inlets and the resin distribution member or can optionally be left to become an integrated part of the finished laminate.

The term 'gelcoat' 104 as used herein is well known to a person skilled in the art. It stands for a tough, protective layer of resin that is sprayed or brushed into the mould before the material layers optionally comprising reinforcing fibres are laid. The material layers are laid once the coating "gels", hence the name. Gelcoat also protects the underlying laminate from UV light, abrasion and hydrolysis. The gelcoat is often pigmented to provide a coloured, glossy surface which improves the aesthetic appearance of the article. The gelcoat is furthermore advantageous in providing good possibilities to repair the outer surface of the component if needed without serious visual impair or damage of its material properties. The gelcoat material can also include pigments to give a coloured product. Such products do therefore not need to be painted after the moulding process.

As mentioned, the gelcoat 104 is generally applied in the mould 103 by spraying, painting or rolling in a single or optionally a very few relatively thick layers yielding a final thickness in the order of 0.4-0.8 mm. The gelcoat can—as mentioned—be applied to the mould in a single or a few thick layers. This is not possible if a paint or coating is applied to the exterior of an otherwise finished component where the paint will then have to be applied in a multiplicity of thin layers in order to obtain the same strength and adhesion of the layer and a high finish as obtainable by the gelcoat.

Gelcoats for composite articles are generally multi-component formulations consisting of a base resin system having incorporated therein various fillers, pigments and other additives. While the selection of these constituents plays an important role in determining the end properties of the gelcoat and its suitability for a given application, the selection of the base resin system dictates the overall end use performance of the gelcoat as a whole. It is well known that unsaturated ester-based polymers are conventionally utilized as the primary backbone in composite gelcoat systems, especially due to demands of durability and aesthetics. Other common gelcoats are based on epoxies, vinyl esters, or polyurethane based resins.

According to prior art technique, the composite component can be given an exterior surface with hydrophobic properties and/or a lotus effect by application of various special coatings, paints or films or by special surface treatment such as etching in order to obtain the lotus-like surface with depressions and elevations.

Figure 2:
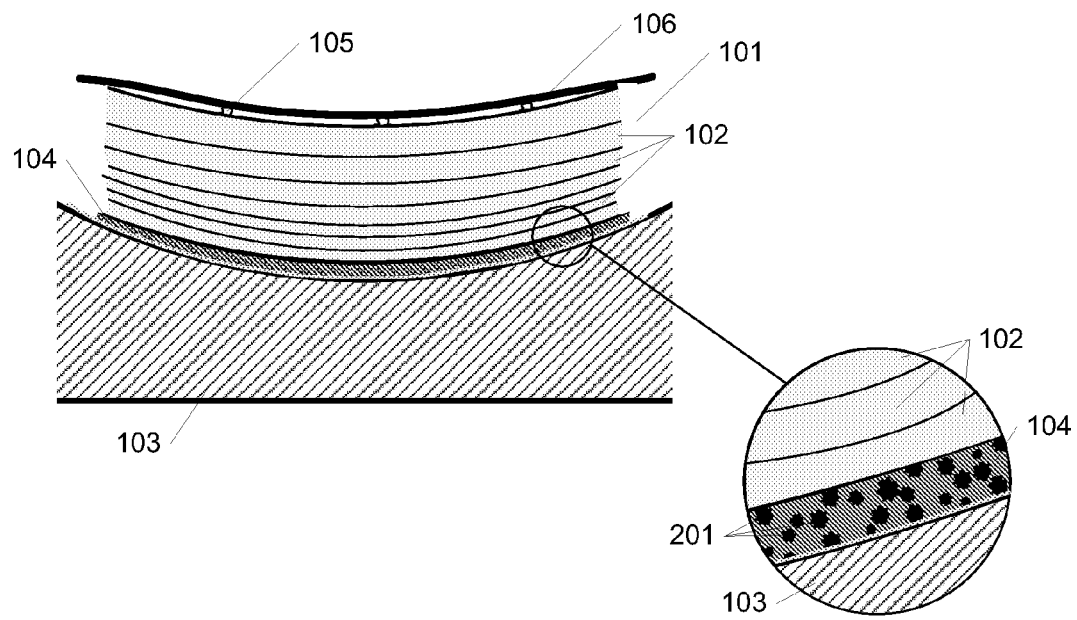
FIG. 2 shows the manufacture of a composite member with the use of a gelcoat comprising particles according to one embodiment of the invention and with a close-up of the gelcoat layer.

According to one embodiment of the invention, a self-cleaning surface with hydrophobic properties is obtained as sketched in FIG. 2 illustrating the manufacture of a composite member 101. A close-up showing the part of the composite member the closest to the mould 103 with a few material layers 102 and the gelcoat layer 104 is shown to the right in the figure. The manufacturing method is unchanged and is as described in relation to FIG. 1 only here, the gelcoat layer 104 comprises particles 201 of another material. The particles 201 are added to the gelcoat 104 either prior or after applying the gelcoat to the mould 103 and are thereby distributed more or less throughout the thickness of the gelcoat. The particles can for instance be added to the gelcoat by simply mixing them into the gelcoat, by spraying or spreading the particles onto the gelcoat layer in the mould or by other methods known to the skilled person. When the composite component 101 is finished and removed from the mould 103, the gelcoat layer 104 comprising the particles 201 then constitutes the outermost layer of the component as illustrated in the FIGS. 3, 4 and 5. Some of the particles 201 will then be exposed on the surface 301 forming elevations 302 in the micro and nano-scale. These particles 201 providing the composite surface with numerous small elevations render the surface of the composite component hydrophobic in leading to rapid droplet formations. As the droplets roll off the surface they absorb dirt particles, thus cleaning the surface.

The particles 201 can for instance be of one or more of the groups of silicates, doped silicates, minerals, metal oxides, silicas, and polymers such as for instance of $TiO_2$, $Al_2O_3$, $SiO_2$, $ZrO_2$, a mineral such as magadit, a silica such as Aerosil, or spray-dried polytetrafluoroethylene (PTFE). In one embodiment particles of Rutile $TiO_2$ are used.

The particles 201 which may advantageously be angular or edged are of sizes in the order of 200-800 nm. For instance Rutile $TiO_2$ particles with sizes of approximately 400 nm have been seen to work fine. The particles may be added to the gelcoat in an amount corresponding to approximately half the volume of the entire gelcoat layer including the particles. In order to improve the effect of the particles it is important that the particles are not lumped together or fully closed packed everywhere throughout the gelcoat layer. A minimum spacing between the particles can be ensured by adding particles of different sizes, for instance by using larger particles of sizes around 400 nm and a further amount of smaller particles with sizes in the order of say 40 nm. The smaller particles will then place themselves in between the bigger particles working as a filler material. The smaller particles could be of another material than the larger particles, but could also be of the same material.

To further expose the outermost particles embedded in the gelcoat in order to enhance the lotus effect of the composite surface, the composite component can be abraded or in other ways worn artificially.

In a further embodiment of the invention the hydrophobic properties of the composite surface is further enhanced by spraying or in a similar way treating the surface with for instance a fluorous substance or compound.

Figure 3:
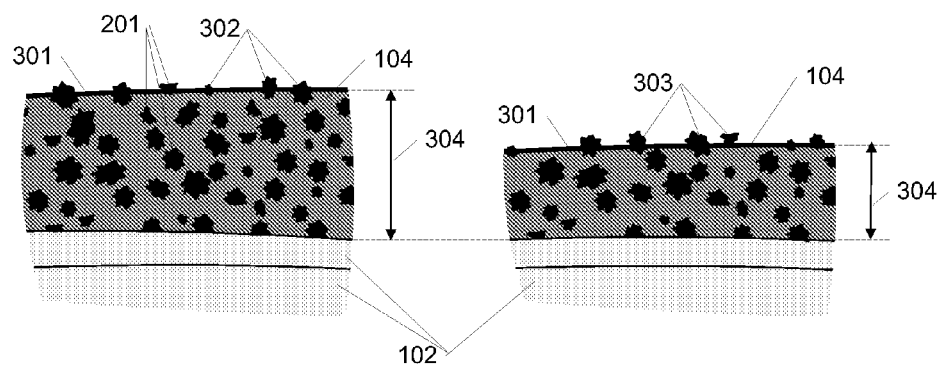
FIG. 3 illustrates the regenerating surface with self cleaning properties of a composite member.

As the particles 201 are present not only at the surface of the gelcoated composite, but also further down in the gelcoat layer, the self-cleaning surface is regenerating as illustrated in FIG. 3. Here, a part of a composite is seen in a cross sectional view at an initial stage to the left in FIG. 3A and to the right (FIG. 3B) in a stage, where the composite has been subjected to a certain amount of wear and degradation either naturally or artificially. As can be seen from the sketches, new particles 303 become exposed and protrude from the composite surface if the composite is worn and the thickness 304 of the gelcoat layer is decreased. The degradation of the composite surface layer can be caused by natural wear, salt in the surrounding atmosphere, dust particles, insects, friction from other components, etc. However, the hydrophobic and self-cleaning properties of the surface can also in one embodiment be renewed simply by abrading the composite, e.g. by polishing, grinding, sand-blasting or the like.

Figure 4:
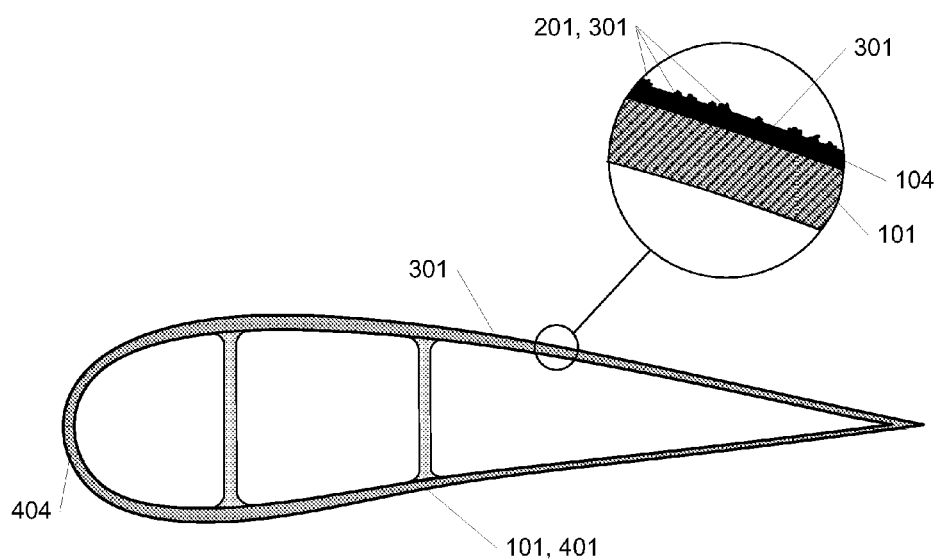
FIG. 4 shows a blade for a wind power plant manufactured according to one embodiment of the present invention and with a close-up of the surface.

The described regenerating surface with self-cleaning properties can be made and is advantageous on gelcoated composite components of various sorts as for instance a blade for a wind power plant as shown in a cross sectional view in FIG. 4. A close-up of the surface is shown in details, where the outermost gelcoat layer 104 of the composite 101 can be seen with a number of particles 201 protruding from the surface 301 rendering the surface self-cleaning. As described above, the particles 201 are also present in the interior of the gelcoat 104 (not shown), whereby the advantageous hydrophobic surface properties become self-regenerating as new particles become exposed and protrude the surface as the old ones are worn off.

In one embodiment of the invention, the described gelcoat layer comprising particles is only applied to special areas of the composite component, where the self-cleaning properties are the most advantageous. This could for instance be in the region around the leading edge 404 of the wind turbine blade 401, where the blades are often seen to be worn and damaged the most during use due to dust particles, small insects and salt in the wind.

A gelcoat comprising particles according to invention could also advantageously be applied for composite components such as boat parts (such as e.g. the hull), the tower, nacelle or the like for wind power plants, vehicles parts, isolators for high voltage wires, etc.

Figure 5:
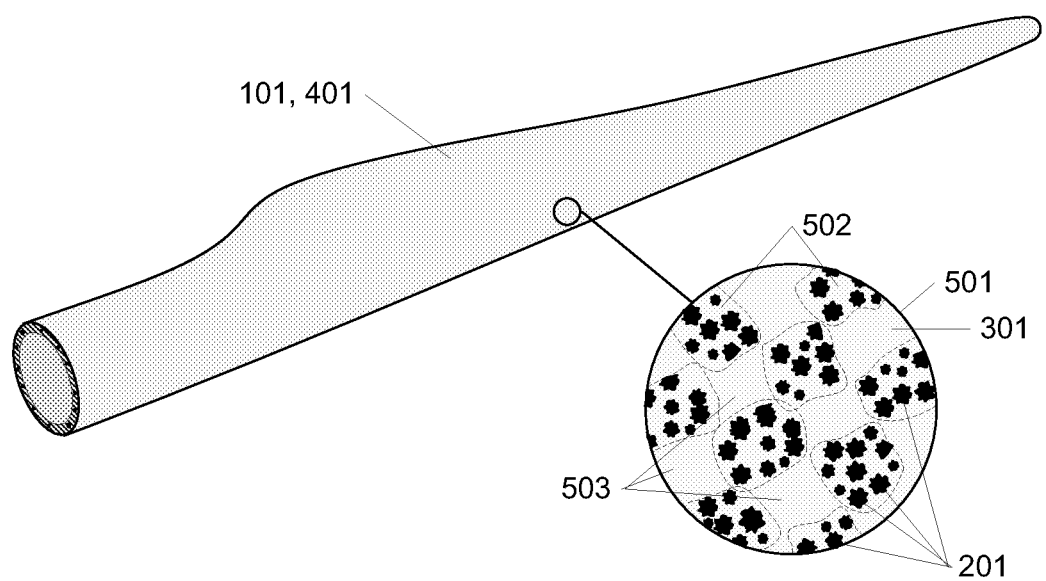
FIG. 5 illustrates a composite member and a close-up of its surface with particles partially exposed and arranged in a pattern.

FIG. 5 illustrates a composite member 101, 401 (in this case a blade for a wind power plant) and a close-up 501 of its surface 301 with particles 201 partially exposed and embedded in the gelcoat layer of the composite. In this embodiment the particles 201 are added to the gelcoat in a way such that they are arranged in a pattern with areas 502 comprising particles and other areas 503 without particles. Hereby is obtained that the particles can act as seeds, whereupon ice and snowflakes in some weather conditions will start to grow. However, as the areas 502 comprising the exposed particles are delimited and surrounded by areas 503 without particles, the built-up ice and/or snow will eventually fall off the surface and a sheet of ice fully covering the composite component is thereby prevented. In the case of a blade for a wind turbine the effect will be snowflakes created on the blade surfaces which then fall off behind the rotating blades. The same effect is obtained if the exposed particles 201 are placed considerable distances apart.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word 'comprising' does not exclude the presence of other elements or steps than those listed in a claim.

The invention claimed is:

1. A method of manufacturing a part for a wind power plant having a composite member,
   wherein the method comprises applying different material layers comprising at least one layer of gelcoat in a mould, and
   wherein resin is applied for joining of different material layers within the mould characterised in adding particles to the gelcoat so that the gelcoat comprising said particles forms an outermost layer of gelcoat, the outermost layer having a number of at least partly exposed particles and a number of fully embedded particles on at least a part of the manufactured composite member,
   wherein the composite member has a surface area comprising regions of exposed particles adjacent to regions of unexposed particles,
   wherein the surface area is self-cleaning and prevents a build-up of ice on the composite member, wherein the particles comprise particles of different sizes, such that smaller particles place themselves between bigger particles working as a filler material to ensure minimum spacing between the bigger particles;
   where the part for the wind power plant is selected from the group consisting of a blade and a nacelle; and
   wherein the regions of exposed particles and the regions of unexposed particles are diamond-shaped and are arranged in a checkered pattern such that the regions of exposed particles and the regions of unexposed particles are arranged alternately.

2. The method according to claim 1 further comprising abrading at least a part of the composite member thereby at least partly exposing some of said particles.

3. The method according to claim 1, wherein said adding of particles is done after said applying of gelcoat in the mould.

4. The method according to claim 1, wherein said adding of particles is done prior to said applying of gelcoat in the mould.

5. The method according to claim 1, further comprising applying a thin layer by spraying of at least a part of the surface with a fluorous compound.

6. The method according to claim 1, wherein at least one material layer is of a fibre reinforced material.

7. The method according to claim 1, wherein at least one material layer is of a plastic foam material.

8. The method according to claim 1, wherein the method is a vacuum forming process.

9. A part for a wind power plant having a composite member, the composite member comprising:
   an outermost layer of gelcoat, the outermost layer having a number of at least partly exposed particles and a number of fully embedded particles; and
   a surface area comprising regions of exposed particles adjacent to regions of unexposed particles,
   wherein the regions of exposed particles and the regions of unexposed particles are diamond-shaped and are arranged in a checkered pattern such that regions of exposed particles and the regions of unexposed particles are arranged alternately;
   wherein the surface area is self-cleaning and prevents a build-up of ice on the composite member, wherein the particles comprise particles of different sizes, such that smaller particles place themselves between bigger particles working as a filler material to ensure minimum spacing between the bigger particles;
   wherein the part for the wind power plant is selected from the group consisting of a blade and a nacelle; and
   wherein the composite member is developed with the outermost layer of gelcoat on at least part of the composite member by applying different material layers comprising at least one layer of gelcoat in a mould, then applying resin for joining of different material layers within the mould, and then adding particles to the gelcoat.

10. The method of claim 1, wherein the gelcoat comprising particles selected from the group consisting of $TiO_2$, $Al_2O_3$, $SiO_2$ and $ZrO_2$ for giving regenerating self-cleaning properties.

11. The part according to claim 9, wherein the bigger particles are about 400 nm in size and the smaller particles are about 40 nm in size.

12. The part according to claim 9, wherein the particles are of one or more materials selected from the group consisting of $TiO_2$, $Al_2O_3$, $SiO_2$ and $ZrO_2$.

* * * * *